INVENTOR.
HERBERT H. STAM
BY John R. Nesbitt
ATTORNEY

INVENTOR.
HERBERT H. STAM
BY John R. Nesbitt
ATTORNEY

# United States Patent Office 3,298,661
Patented Jan. 17, 1967

3,298,661
UNIDIRECTIONALLY SELF-LOCKING VALVE
Herbert H. Stam, P.O. Box 86, Watseka, Ill. 60970
Filed Dec. 19, 1963, Ser. No. 331,670
10 Claims. (Cl. 251—104)

This invention relates to a unidirectionally self-locking valve and more particularly to a liquid or gas valve having safety means precluding accidental opening of said valve without inhibiting closing.

As is well known in the art, valves of many types and descriptions have been used for many years to control the flow of liquids and/or gases. One of the more popular types of valves in common use utilizes a rotatable stem which, when rotated in one direction, closes the valve and which, when rotated in the opposite direction, opens the valve. In the case of the globe valve and the angle valve, for example, rotation of the stem simultaneously causes axial displacement, which displacement opens or closes the valve depending upon the direction of the axial movement.

While valves having a rotatable stem have proven to be successful for many purposes, such valves have been found deficient where it is highly important that the valve not be accidentally opened. This would obviously occur where a high degree of danger exists should the liquid or gas escape. By way of common example, such a danger exists when handling ammonia or propane gases, the former being used extensively in agriculture and the latter being used extensively for home heating purposes.

Accidental opening of a valve having a rotatable stem can occur for a variety of reasons, such as, for example, brushing against the wheel on the end of the stem, dropping a hose having such a valve attached to the free end, or through handling by unskilled workers or children. Regardless of cause, however, the result is often serious injury when the valve is blocking passage of dangerous substances which can escape when the valve is accidentally opened.

While it is true that many systems for transferring dangerous substances include some sort of safety means, such means is often removed a considerable distance from the valve and, therefore, is ineffective until after considerable damage has occurred. This is readily shown, again by way of example, where a hose is used to transfer ammonia from a main storage tank to a smaller tank for agricultural field use purposes. In this situation, the transfer is usually made with a hose of considerable length and, while a check valve is usually placed at the main storage tank, considerable ammonia can escape, if the valve at the end of the hose is accidentally opened, before the check valve would be effective to stop the flow of ammonia.

It is therefore an object of this invention to provide an improved valve having means whereby said valve is precluded from being opened accidentally.

It is another object of this invention to provide an improved valve having means for locking said valve against accidental opening but in no way hindering said valve from being closed.

It is still another object of this invention to provide a unidirectionally self-locking valve having a rotatable stem and releasable means for precluding rotation of said stem in a direction opening said valve at least when said valve is closed, but at all times permitting unhindered rotation of said stem in the opposite direction closing said valve.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiments of the herein disclosed invention may be included as come within the scope of the claims.

The accompanying drawings illustrate two complete examples of the embodiment of the invention constructed according to the best mode so far devised for the practical application of the principles thereof, and in which.

Figure 1:
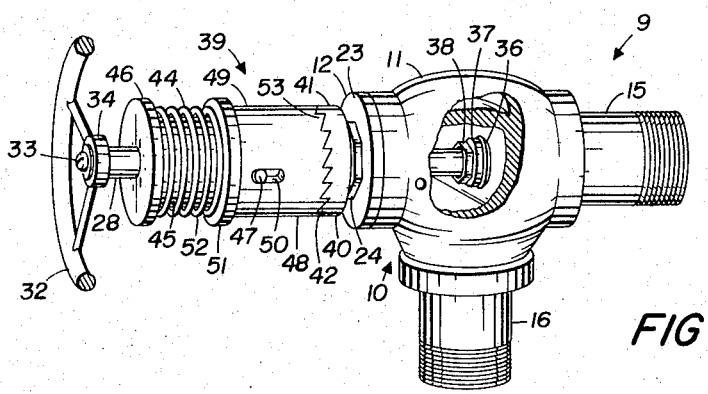
FIGURE 1 is a perspective view of the valve of this invention having portions cut away to illustrate said valve in a closed position and precluded from being opened accidentally.

Referring now to the drawings in which like numerals have been used for like characters throughout, the numeral 9 indicates generally the valve of this invention. Although valve 9 has been shown herein as an angle valve, the invention is not meant to be limited thereto since any type of valve having a rotatable stem for opening and closing purposes could be utilized, as will be brought out more fully hereinafter.

Figure 2:
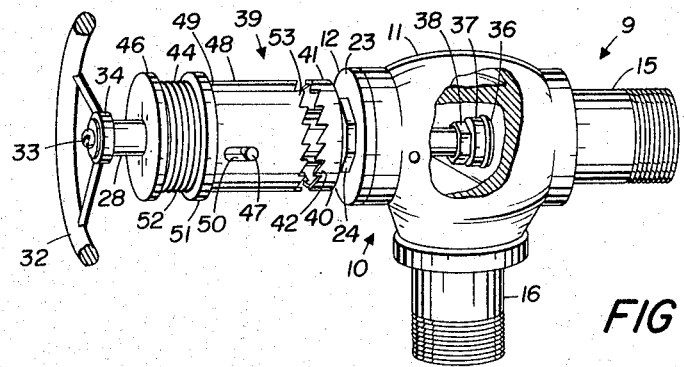
FIGURE 2 is a perspective view similar to that of FIGURE 1 illustrating said valve in a closed position but free to be opened.
Figure 3:
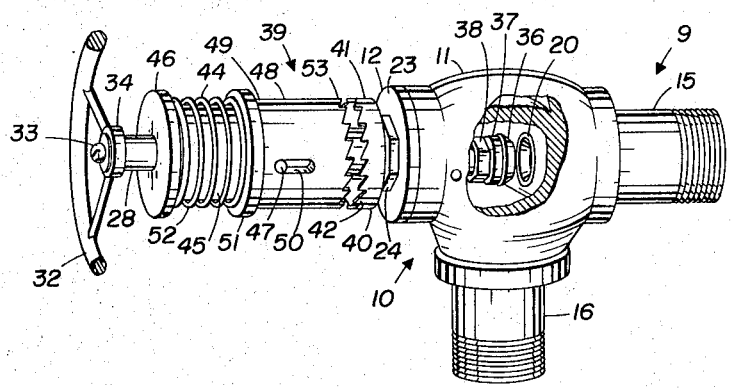
FIGURE 3 is a perspective view similar to that of FIGURES 1 and 2 but illustrating said valve in the open position.

As shown in FIGURES 1 through 4, valve 9 includes a valve body 10 consisting of a main portion 11 and a bonnet 12. Main body portion 11 has three bores therein, one of which serves as an inlet port 13 and another of which serves as an outlet port 14. (In addition, a small bleeder opening, as indicated in FIGURES 1, 2, and 3 is also utilized). As shown best in FIGURE 4, inlet port 13 and outlet port 14 are internally threaded so that each receives one externally threaded end of pipes 15 and 16, respectively. Pipes 15 and 16 are likewise each externally threaded at the other ends for utilization purposes, and pipe 15 may, for example, be attached to a hose 17, while pipe 16 may be screwed into an internally threaded opening in a tank (not shown) to be filled with liquid or gas.

Figure 4:
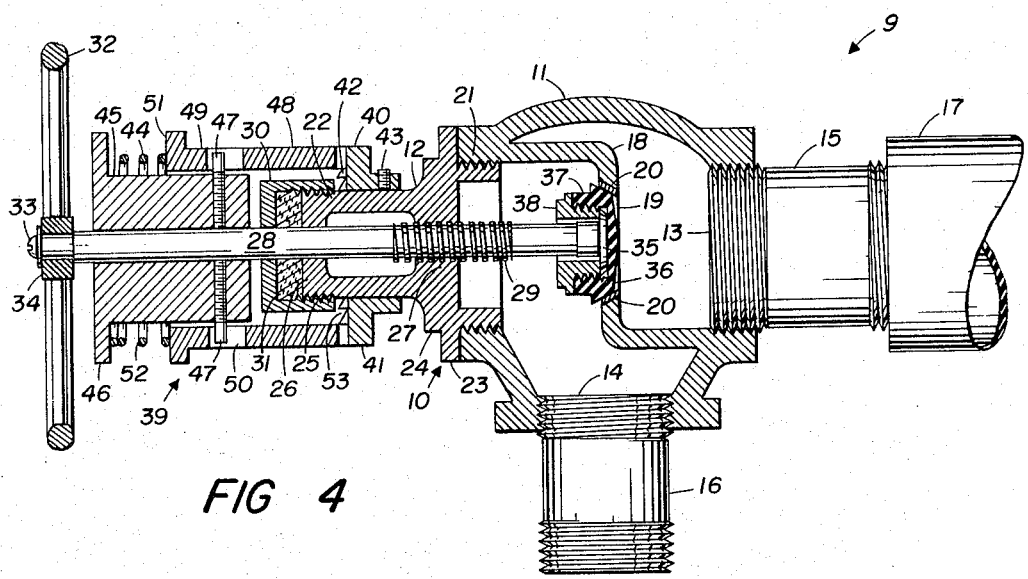
FIGURE 4 is a side-sectional view of the valve of this invention as illustrated in FIGURE 1.

Inlet and outlet ports 13 and 14 are isolated from one another by means of a partition 18 having an opening 19 therein (see FIGURE 4). As is customary, a seat 20 is positioned around the edge of opening 19. The third bore in the main portion of valve body 11 is internally threaded and has one end 21 of bonnet 12 screwed therein, said end being externally threaded, of course, for this purpose. Bonnet 12 includes a cylindrical portion 22 having a large integrally formed shoulder 23 adjacent to the threads on end 21, and a smaller integrally formed shoulder 24 next to shoulder 23. Shoulder 24 may be hexagonally shaped, if desired, to facilitate screwing bonnet 12 onto the main body portion 11.

End 25 of cylindrical portion 22 terminates in an inwardly directed mounting flange, or stem guide, 26. A second inwardly directed mounting flange 27 is positioned on bonnet 12 opposite shoulders 22 and 23. Flange 27 is internally threaded at the edge and flanges 26 and 27 support valve stem 28, which stem has the portion 29 engaging flange 27 externally threaded so that rotation of stem 28 causes axial displacement of the stem in a direction dependent upon the direction of rotation. As shown in FIGURE 4, if the stem is rotated counterclockwise the stem is displaced axially outwardly from the valve body, and if rotated clockwise the stem is displaced axially inwardly toward the valve body. In addition, an internally threaded packing nut 30 is screwed onto end 25 of cylindrical portion 22 of bonnet 12 to confine packing 31 between the nut and mounting flange 26. Packing nut 30 has an opening therein just large enough to receive stem 28 and the packing surrounds the stem, of course.

A hand wheel 32 is secured to the outer end of stem 28 to facilitate rotating the stem. Hand wheel 32 is fastened to stem 28 by means of screw 33 threaded into the end of the stem. Stem 28 has a pair of oppositely positioned flat sides at the outer end inserted into a comparable opening in the hub 34 of the wheel so that the stem is constrained to rotation with the wheel.

Stem 28 has an enlarged head 35 at the inner end (within the valve body) to which is attached a disc 36. Disc 36 has a tapering outer edge, which edge, as shown in FIGURES 1, 2, and 4, tightly engages seat 20 when the valve is closed. Disc 36 has an internally threaded collar 37 and is fastened to the enlarged head 35 of stem 28 by means of a nut 38.

The unidirectional locking means 39 of this invention includes a member 40 having a sleeve 41 of sufficient diameter to fit over cylindrical portion 22 of bonnet 12. As shown best in FIGURE 5, sleeve 41 may be of larger diameter near the outward end (i.e., away from the valve body) and this end terminates in a series of outwardly extending teeth 42. Sleeve 41 is attached to bonnet 12 (which is a part of the valve body) by means of set screw 43. The exact configuration of member 40 can vary to fit the need and could, for example, have a substantially U-shaped cross section in which case the member would include, in reality, a pair of concentric cylinders.

The second member 44 of unidirectional locking means 39 includes a second sleeve 45 having an enlarged head, or flange, 46 at one end and is attached to stem 28 near the other end by means of a pair of set screws 47. Set screws 47 project radially outwardly beyond the sleeve and serve as pins to hold third sleeve 48 in position, as brought out hereinafter. If desired, flange 46 could be directly secured to the stem by means of screws 47 and a separate set of pins used to position sleeve 48.

Sleeve 48 is larger in diameter than sleeve 45 (sleeve 48 is preferably of the same diameter as that of the larger diameter portion of sleeve 41) and has one end 49 telescoped onto the end of sleeve 45 opposite flange 46. Sleeve 48 has a pair of axially extending slots 50 therein near end 49, which slots receive the ends of the projecting screws, or pins, 47 to thus constrain sleeve 48 to rotation with stem 28. End 49 of sleeve 48 terminates in a flange 51, and a spring 52 is confined between flanges 46 and 51 to spring bias sleeve 48 inwardly toward the valve body. Sleeve 48 terminates at the inwardly facing edge (i.e., facing toward the valve body) in a series of teeth 53, which teeth engage teeth 42 on sleeve 41 when the valve is closed. As can be seen from FIGURES 1, 2, 3, and 5, the teeth are formed so that clockwise rotation of stem 28 is freely permitted when said teeth are engaged while counterclockwise rotation of the stem is precluded.

Figure 6:
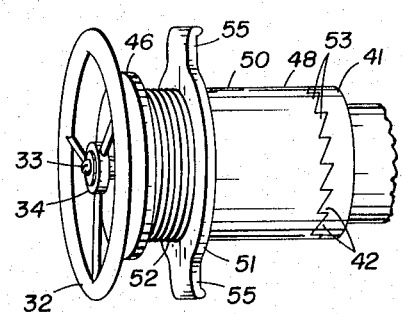
FIGURE 6 is a perspective view of an alternate embodiment of the unidirectional locking means of this invention.

An alternate embodiment of the unidirectional locking means is shown in FIGURE 6 where a pair of projecting ears 55 are shown to extend from flange 51 so that the bias supplied by spring 52 may be readily overcome when it is desired to retract sleeve 48 to open the valve.

In operation, unidirectional locking means 39 does not affect rotation of stem 28 so long as the valve is in the open position, as shown in FIGURE 3. This is due to the fact that the teeth on sleeves 41 and 48 are held out of engagement because of the axial displacement of the stem outwardly when the valve was opened. As shown in FIGURE 3, the spring has biased sleeve 48 to its outermost position (the axial travel of sleeve 48 is, of course, determined by the size of slot 50). When the valve is then closed by rotation of stem 28 clockwise, locking means 39 does not hinder closing since the teeth are formed in a manner such that clockwise rotation of the stem causes the tapering surfaces of the teeth to come into contact, and, as shown best in FIGURE 5, these surfaces can readily slide over one another (there will be a slight retraction of sleeve 48 due to the wedging action of these surfaces but this will not hinder valve closing appreciably).

Figure 5:
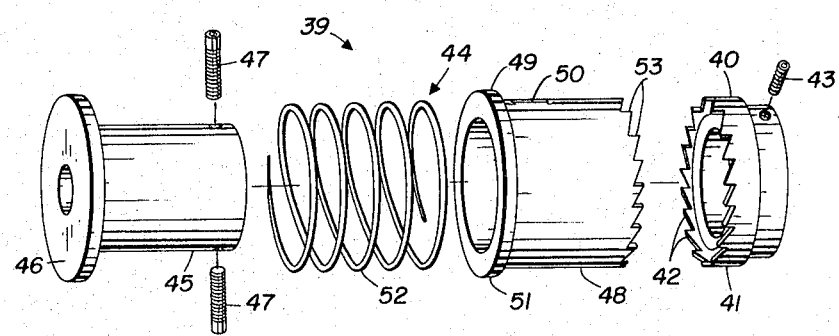
FIGURE 5 is an exploded perspective view of the unidirectional locking means of this invention.

When the valve is closed, however (or at least closed far enough for the teeth to be engaged), locking means 39 precludes the valve from being accidentally opened. This is due to the fact that counterclockwise rotation of the stem causes the perpendicular surfaces of the teeth to come into contact, as shown in FIGURE 5, and this blocks rotation of the stem since the teeth can no longer slide past one another. As shown in FIGURE 1, when the valve is in the closed position, the stem is displaced axially inwardly a sufficient distance to allow the teeth to be engaged.

When it is desired that the valve be opened, sleeve 48 is retracted by overcoming the bias on spring 52, as shown in FIGURE 2 (sleeve 48 is axially retractable because of the slots 50 therein). By grasping sleeve 48 and pulling it outwardly toward hand wheel 32, the teeth on sleeve 48 are disengaged from the teeth on sleeve 41, and the stem may then be rotated counterclockwise to open the valve. Retraction of the sleeve and rotation of the stem can be simultaneously accomplished with one hand by rotating the stem with the palm while the fingers lift (or retract) the sleeve. If desired, ears 55, as shown in FIGURE 6, or other convenient means, such as detents, for example, can be added as an aid in grasping the sleeve for retraction.

From the foregoing, it should be obvious to those skilled in the art that the valve of this invention incorporates a novel means for unidirectional self-locking of the valve to preclude accidental opening thereof.

What is claimed as my invention is:

1. A unidirectional locking device, comprising: a first sleeve adapted to be connected to a housing and having one edge terminating in a series of teeth; a second sleeve adapted to be connected to a rotatable shaft; a third sleeve having one edge terminating in a series of teeth engageable with the teeth on said first sleeve so that when said teeth are engaged rotation of one sleeve relative to the other is precluded in one direction, said third sleeve being larger in diameter than said second sleeve and being received thereover with said third sleeve being constrained to rotation with said second sleeve but longitudinally movable with respect thereto; and means for biasing said first and third sleeves toward engagement of said teeth.

2. A unidirectionally self-locking valve, comprising: a valve body having inlet and outlet ports; means including a stem for operationally controlling said valve, each stem being rotatably mounted on said valve body in a manner such that rotation of said stem in one direction causes such valve to be opened and rotation of said stem in the opposite direction causes said valve to be closed; a first sleeve having one edge terminating in a series of teeth; a second sleeve; a third sleeve having one edge terminating in a series of teeth engageable with the teeth on said first sleeve when said valve is at least partially closed so that when said teeth are engaged rotation of one sleeve relative to the other is precluded in one direction, said third sleeve being larger in diameter than second sleeve and being received thereover with said third sleeve being constrained to rotation with said second sleeve but longitudinally movable with respect thereto; and means for constraining one of said first and second sleeves to rotation with said stem and the other of said first and second sleeves connected with said valve body.

3. A unidirectionally self-locking valve, comprising: a valve body having at least three bores therein, the first of which is an inlet port and the second of which is an outlet port; means for opening and closing said valve including a stem having a diameter smaller than the third bore in said valve body; means mounting said stem with the central portion received in said third bore, said means causing said stem when rotated in one direction to displace said stem inwardly to close said valve and when rotated in the opposite direction causing said stem to be displaced outwardly to open said valve; a first sleeve attached to said valve body and substantially concentrically positioned with respect to said stem, the outwardly facing edge of said sleeve terminating in a series of outwardly extending teeth; a second sleeve substantially concentrically positioned with respect to and constrained to rotation with said stem, said second sleeve having the edge nearest said first sleeve terminating in a series of inwardly extending teeth, said sleeve being positioned so that the teeth on one sleeve engage the teeth on said other sleeve when said valve is at least partially closed; means for biasing said sleeves toward engagement; and means attached to one of said sleeves permitting retraction of the same for disengaging said teeth and thereby permitting said stem to be rotated, said sleeve to be retracted including an axial slot therein, and said last named means including a spring and a third sleeve smaller in diameter than said sleeve to be retracted but larger in diameter than said stem, said third sleeve having a flange at one end and a pin near the other end extending radially outwardly therefrom, said second sleeve being telescoped onto said other end of said third sleeve and having said pin received in said slot therein, and said spring being confined between said flange and said sleeve to be retracted to bias the latter toward the other said sleeve.

4. A unidirectionally self-locking valve, comprising: a valve body having inlet and outlet ports; means including a stem for operationally controlling said valve, said stem being rotatably mounted on said valve body in a manner such that rotation of said stem in one direction causes said valve to be opened and rotation of said stem in the opposite direction causes said valve to be closed; and releasable means connected to said stem and said valve body for precluding rotation of said stem in said one direction at least whenever said valve is closed but at all times permitting rotation of said stem in said opposite direction, said releasable means including first and second members having engageable unidirectional locking portions, said first member being constrained to rotation with said stem and said second member being attached to said valve body, said engageable locking portions of said first and second members including teeth formed in a manner such that rotation of said stem in the direction opening said valve is precluded whenever said locking portions are engaged, said stem being axially displaced when rotated, and said first and second members being engaged only when said valve is at least partially closed.

5. A unidirectionally self-locking valve, comprising: a valve body having at least three openings therein, one of which is an inlet port and the second of which is an outlet port; means including a stem for opening and closing said valve, said stem being rotatably mounted in the third opening in said valve body with a part of said stem protruding therefrom, said stem when rotated in one direction causing said valve to be opened and when rotated in the opposite direction causing said valve to be closed; a first locking member attached to said valve body and having at least one portion adjacent to said stem; and a second locking member mounted on and constrained to rotation with said part of said stem protruding from said valve body, said second locking member having a portion engageable with said one portion of said first locking member, said locking members precluding rotation of said stem in said one direction whenever said portions are engaged but permitting rotation of said stem in said opposite direction even though said portions are engaged, said stem when rotated in said one direction causing axial movement of said stem so that a greater portion protrudes from said valve body and when rotated in said opposite direction causing axial movement of said stem so that a smaller portion protrudes from said valve body, and said first and second locking means being positioned so that the engageable portions of said locking members are engaged only when said valve is at least partially closed.

6. A unidirectionally self-locking valve, comprising: a valve body having inlet and outlet ports; means including a stem and handle means for operationally controlling said valve, said stem being rotatably mounted on said valve body in a manner such that rotation of said stem in one direction causes said valve to be opened and rotation of said stem in the opposite direction causes said valve to be closed; and releasable means including first and second members having engageable unidirectional locking portions with said first member being constrained to rotation with said stem and said second member being connected with said valve body, said members being relatively movable so that movement of one of said members toward said handle means frees said stem for rotation in either direction.

7. The valve of claim 6 wherein said first member has enlarged portions thereon and wherein said handle means is a wheel whereby said wheel and enlarged portions of said first member can be grasped for simultaneous movement of said first member toward said wheel and rotation of said stem and wheel.

8. A unidirectionally self-locking valve, comprising: a valve body having at least three bores therein, the first of which is an inlet port and the second of which is an outlet port; means for opening and closing said valve including a stem having a diameter smaller than the third bore in said valve body, said stem being mounted for rotation with the central portion received in said third bore; means on said stem and valve body for causing said stem to be displaced inwardly when said stem is rotated in one direction to thereby close said valve and to be displaced outwardly when said stem is rotated in the opposite direction to thereby open said valve; a first sleeve attached to said valve body and positioned substantially concentric to said stem, the outwardly facing edge of said first sleeve terminating in a series of outwardly extending teeth; flange means on said stem outwardly of said valve body, said flange means being attached to said stem; pin means between said flange means and said valve body, said pin means extending radially outwardly from and constrained to rotation with said stem; a retractable sleeve positioned substantially concentric to said stem and positioned between said flange means and said valve body, said retractable sleeve having an axial slot therein receiving said pin means and constraining said retractable sleeve to rotation with said stem, the inwardly facing edge of said retractable sleeve terminating in a series of teeth engageable with the teeth on said first sleeve, said teeth being formed so that when in engagement rotation of said stem is permitted only in the direction closing said valve; and a spring between said flange means and said retractable sleeve for biasing said retractable sleeve toward engagement of said teeth.

9. The valve of claim 8 further characterized by a wheel at the outward end of said stem, said wheel being of a diameter such that both said wheel and said second collar can be grasped for simultaneous retraction of said collar and rotation of said stem.

10. A unidirectional locking device, comprising: a first sleeve adapted to be connected to a housing, said first sleeve terminating at one end in a series of teeth; a second first sleeve adapted to be connected to a housing, said first sleeve terimnating at one in a series of teeth; a second sleeve having a flange at one end and adapted to be connected to a rotatable shaft positioned substantially concentric to said second sleeve; pin means extending radially outwardly from said second sleeve near the end opposite to said flange; a third sleeve larger in diameter than said second sleeve and having at least one portion telescoped onto the end of said second sleeve opposite said flange, said portion of said third sleeve having longitudinally extending slot means therein receiving said pin means, said third sleeve terminating at one end in a series of teeth engageable with the teeth of said first sleeve to preclude rotation of said first sleeve relative to said second and third sleeves in one direction only when said teeth are engaged; and spring means confined between said flange and said third sleeve to bias said third sleeve toward said first sleeve.

References Cited by the Examiner

UNITED STATES PATENTS

| | | | |
|---|---|---|---|
| 582,252 | 5/1897 | Ashley | 251—166 |
| 1,071,499 | 8/1913 | Baker | 287—91 X |
| 1,671,594 | 3/1927 | Kohlmann | 251—90 |

M. CARY NELSON, *Primary Examiner.*

R. C. MILLER, *Assistant Examiner.*